United States Patent [19]

Funk

[11] 4,089,670

[45] * May 16, 1978

[54] HIGH ANALYSIS FERTILIZERS

[75] Inventor: Roger Calvin Funk, Kent, Ohio

[73] Assignee: The Davey Tree Expert Company, Kent, Ohio

[*] Notice: The portion of the term of this patent subsequent to Jul. 19, 1994, has been disclaimed.

[21] Appl. No.: 800,125

[22] Filed: May 24, 1977

Related U.S. Application Data

[63] Continuation-in-part of Ser. No. 634,108, Nov. 21, 1975, Pat. No. 4,036,627.

[51] Int. Cl.$^2$ ................................................ C05C 9/00
[52] U.S. Cl. ............................................ 71/29; 71/34; 71/64 C
[58] Field of Search ................ 71/28, 29, 34, 64 C, 71/64 D, 64 B, 64 DC; 260/555 R, 555 C

[56] References Cited

U.S. PATENT DOCUMENTS

| | | | |
|---|---|---|---|
| 1,547,732 | 7/1925 | Broodbridge et al. | 71/64 B |
| 2,774,660 | 12/1956 | Cook et al. | 71/64 DB |
| 3,479,175 | 11/1969 | Murphy, Jr. et al. | 71/29 |
| 3,649,598 | 3/1972 | Namioka et al. | 71/28 X |
| 4,036,627 | 7/1977 | Funk | 71/29 |

FOREIGN PATENT DOCUMENTS

| | | | |
|---|---|---|---|
| 555,805 | 4/1958 | Canada | 71/29 |
| 264,406 | 3/1970 | U.S.S.R. | 71/29 |

*Primary Examiner*—Frank A. Spear, Jr.
*Assistant Examiner*—Ferris H. Lander
*Attorney, Agent, or Firm*—Dowell & Dowell

[57] ABSTRACT

High analysis fertilizer formulations of a low bulk density powdered ureaform having soluble and insoluble components combined with soluble monopotassium phosphate in which the resulting mixtures are dry homogeneous blends that are free of fillers and binding agents and may be carried in liquid for application to surface or subsurface areas by conventional liquid fertilizer applying equipment.

11 Claims, No Drawings

HIGH ANALYSIS FERTILIZERS

CROSS-REFERENCE TO RELATED APPLICATION

This application is a continuation-in-part application of Ser. No. 634,108, filed Nov. 21, 1975, now U.S. Pat. No. 4,036,627, issued July 19, 1977.

BACKGROUND OF THE INVENTION

1. Field of the Invention

This invention relates generally to high analysis fertilizer mixtures of synthetic organic and inorganic materials and particularly to formulations and methods for blending and using monopotassium phosphate with a very fine particulate ureaformaldehyde blend to form dry homogeneous, low burn, high analysis fertilizers which may be carried in liquid for application in surface and subsurface spraying and injection fertilization.

2. History of the Prior Art

As discussed in applicant's prior application Ser. No. 634,108, the use of fertilizer blends of both organic and inorganic material has become recognized as being advantageous in many fertilizer applications. Such blends not only supply nutrients which may be immediately absorbed into the plant root system, but also provide a source of long term nutrient supply.

In order for any nutrient material to be absorbed by a plant root system, it must be dissolved to create various ion structures or salts which are readily attracted and absorbed into the root tissue by an ion exchange process. The inorganic fertilizer material which may include phosphates and potassium are soluble in water and form ions readily when dissolved. Therefore when such fertilizers are supplied to the soil in liquid form, the nutrient ions or salts are immediately available for absorption, or, if dry inorganic fertilizers are used, the nutrient ions or salts become available as water is percolated through the soil.

Various organic fertilizers, those structures which include animal, vegetable and synthetic carbon structures, on the other hand, are advantageous in that they exhibit slower rates of decomposition. That is, organic fertilizer material ordinarily is not readily soluble in water, but only breaks down by microorganism action in the soil to release nutrient ions over a period of time and thus a single fertilizer application may supply nutrients for an extended period. Such organic materials are often referred to as slow release fertilizers.

As mentioned above, organic and inorganic fertilizers may be supplied in either soluble or insoluble form and may either be spread or sprayed onto surface areas or injected or otherwise supplied to subsurface areas. However, when using readily soluble fertilizers, one is limited to the amount of nutrients which may be effectively supplied to the soil without causing damage to plant tissues, a problem commonly referred to as plant or root burn. As the nutrients of the soluble fertilizer are readily dissolved for plant absorption, an excessive amount of salt concentration due to the number of ions released adjacent the root system, may suppress the water absorption by the roots and in some cases may extract moisture from the plant causing the plant to be subjected to a moisture deficiency. However, various fertilizer nutrients are less likely to cause root burn even when in a soluble state. Generally, the potential for causing root burn is determined by the salt index of the particular nutrient, as the greater the salt index, the greater the ion concentration in the soil. Often fertilizers contain significant quantities of high salt index ingredients which, although containing necessary nutrients, may be harmful if supplied in excessive quantities.

Insoluble fertilizers, on the other hand, must be broken down by either chemical or biodegradable action and thus the rate of salt supply may be reduced somewhat depending upon climatic and soil conditions. Also, many insoluble fertilizers having particulate material of a size to be readily blended with soluble material are generally not readily adaptable to the presently increasing use of pressure or hydraulic fertilizer injection techniques since the particle sizes of the insoluble material are not small enough to allow the fertilizer material to be injected through small bore nozzles.

The possibility of root burn is further increased if high analysis fertilizers are used since a greater concentration of available nutrient ions are present. High analysis fertilizer compositions are generally viewed as those in which the total percent of the nitrogen is equal to or exceeds 20% of the overall fertilizer weight and the total percent of the nitrogen, potassium and phosphate nutrients is at least 40% of the fertilizer weight.

The use of high analysis fertilizers is often desirable for several reasons. Not only will the nutrients be supplied to the consumer in less bulk, but the amount of nutrients applied per surface or subsurface applications may be significantly increased. Again, however, as the concentration of nutrient ions is increased, the danger of root burn also increases.

In addition to their burn potential, all nutrient salts or ions are subject to leaching as water dissolves minute quantities of the fertilizer material. Such dissolved material usually moves with the water and leaches away from the area of the roots. However, all nutrients do not leach to the same degree. As an example, nitrate salts (the form of nitrogen primarily absorbed by plant roots) move with ground water and rapidly leach from the root zone while potassium is moderately leached and only a trace of phosphorus is lost. Therefore, in order to insure that a source of nitrogen is maintained in the soil, an insoluble nitrogen could be used to reduce ion loss due to leaching.

Subsurface application of fertilizers is recognized as being a highly desirable method by which to provide for the efficient and effective feeding and caring of trees, shrubs and lawns by supplying nutrients directly to the area of the plant roots. Such application has the added advantage, over surface fertilizing, of decreasing the amount of fertilizer runoff or leaching caused by the action of surface waters.

In this regard, there are generally two widely accepted methods by which fertilizers may be supplied to subsurface areas. These methods include subsurface treatment with a dry fertilizer using drill or bore hole application techniques, and the subsurface injection of a liquid type fertilizer using injection apparatus.

There are, however, particular problems associated with the subsurface application of fertilizers in either dry or liquid form, especially when considering possible plant damage, economics and labor requirements. Thus, the objective of any fertilization process is the application to the soil of an optimum quantity of various macro and/or micro nutrients to insure the proper ratio and amounts of nutrient ions necessary for plant growth and nourishment in such a manner that expenses and application time are maintained at a minimum.

Liquid injection usually is desirable over dry bore hole methods because a subsurface application of fertilizer may be made in less time and therefore at a significant reduction in total man hours. However, most liquid fertilizers utilize soluble nutrients which if applied at the recommended nutrient level would cause root burn as an excessive amount of ions would be present in the soil immediately after the application, thereby leading to the depletion of the root water supply, as previously discussed. In practice, therefore, liquid injection techniques have necessitated a reduction in the amount of available nutrients supplied per application. For example, if the optimum quantity of a fertilizer nutrient supply is 6 lbs. of nitrogen per 1,000 square feet of root area per year, in practice approximately ½ to 2 lbs. per 1,000 square feet could be applied without fear of damage due to the possible plant or root burn which would be caused if all the nutrients were available in a soluble form.

Bore hole applications of dry fertilizers, on the other hand, permit the use of the generally insoluble or less soluble particulate material. Currently, many dry type fertilizers contain a combination of readily available inorganic and organic nutrients and slow release long chain organic nutrients. If a fertilizer includes a long chain synthetic organic nitrogen supply, the nitrogen is released only after the carbon chain is slowly broken down by chemical and biological reaction as water seeps through the soil. Thus, with a dry fertilizer, the total nutrient supply may be applied in a single application with a significant reduction in the immediately available nutrient ions thereby reducing the possibility of plant or root burn. However, the time and cost of labor to apply dry fertilizer is greater than that of using liquid injection techniques. This is because holes must be bored or drilled around each plant to be fertilized.

Therefore, although subsurface applications of dry fertilizers are advantageous in permitting an increased nutrient supply by way of slow release nitrogen components to reduce burn potential, pressure or hydraulic injection of fertilizers is often preferred as it is a quicker and easier method by which fertilizer may be applied to subsurface areas without the extra work necessitated by more traditional drill or bore hole techniques.

To obtain the joint benefit of liquid injection together with short and long term nutrient release of some dry fertilizers, it is important to provide a mixture of organic and inorganic fertilizer material which, when mixed with water, forms a solution of the inorganic material and a portion of the organic material and forms a suspension of the remainder of the organic material. Normally a dry inorganic material is supplied in granular or pellet form. However, since such material dissolves readily in water, it does not clog hydraulic equipment. On the other hand, granular or pellet sized particles of some insoluble organic material are not suitable for use with hydraulic injection equipment, as the particles do not pass through the openings in conventional subsurface injection equipment. The problem is in providing a uniform blend of dry soluble and insoluble organic and soluble inorganic fertilizer components which can be injected to subsurface areas when in the presence of a liquid carrier.

Further, in mixing dry synthetic organic material such as ureaformaldehyde, or ureaform, as the requisite particle size is decreased, the more the material exhibits an ability to "flow" because of its low bulk density. That is, as the powdery organic particles are mixed with various inorganic materials in granular or pellet form, they tend to readily separate or settle through the mixture and thus the overall blend is not homogeneous or uniformly mixed. Various prior art methods for effectively dry blending insoluble organic material such as ureaform with soluble inorganic materials have necessitated that the insoluble particle size be approximately the same size as the soluble particles and therefore the insoluble material is not suitable for subsurface injection.

Therefore, to provide the market or consumer with a fertilizer having water soluble inorganic material with very fine particulate water insoluble organic material uniformly suspended therein which could be used for subsurface applications, it has been necessary to blend the organic and inorganic material in a solution. By wet mixing, the problem associated with dry blending may be avoided, however, shipping, packaging, consumer handling and other such problems are increased due to the necessity that the fertilizer could only be available as a liquid or slurry.

Some examples of the prior art include U.S. Pat. Nos. 2,864,685 to Waters et al; 3,024,098 to Austin et al; 3,333,940 to Ridgeway; 3,479,175 to Murphy, Jr. et al; 3,649,590 to Namioka et al; 3,677,736 to Formaini; Canadian Pat. No. 555,805 to Mortenson et al; and Russian Pat. No. 264,406.

SUMMARY OF THE INVENTION

The present invention is embodied in dry homogeneous high analysis fertilizer blends of a powdered synthetic organic fertilizer material which is of a size to pass at least an 60-mesh sieve and which has an approximate ratio in the range of 3:1 to 1:1 of water insoluble to water soluble nitrogen releasing nutrients and combined with a water soluble inorganic monopotassium phosphate in mixtures to form fertilizers having ratios of nitrogen, phosphorus and potassium of approximately 2 to 5 parts nitrogen to 1 part each of phosphorus and potassium.

It is an object of the invention to provide dry homogeneous high analysis fertilizer blends which contain the nutrients N, P and K as supplied only by the combination of an organic fertilizer such as ureaformaldehyde which has a large percentage of its available nitrogen in a slow release form and an inorganic, water soluble, low salt index fertilizer such as monopotassium phosphate which may be handled and shipped as dry materials but which may be mixed with water for use with conventional fertilizer injection and spraying equipment.

It is a further object of the invention to provide high analysis fertilizers having both slow release, generally insoluble, and fast release, generally soluble, nitrogen supply in an optimum ratio of 2:1 respectively which may be applied to subsurface areas.

It is another object of this invention to provide high analysis fertilizers containing both organic materials having a substantial amount of nitrogen available in a slow release or generally water insoluble form and inorganic materials having a low fertilizer salt index factor so that an increased amount of nutrients may be supplied per application while avoiding the possibility of "burn" damage to plant life.

It is another object of this invention to provide high analysis fertilizers having an approximate ideal ratio of 3:1:1 of nitrogen, phosphate, and potassium, respectively, which can be applied by liquid injection techniques without causing root or plant burn.

It is a further object of the invention to provide dry fertilizers which are capable of being mixed with water for use in subsurface injection to provide localized short and long term nutrients to plant root areas.

It is another object of the invention to provide long term fertilizers in which the total nutrients available in a single fertilizing application are available over an extended period of time.

DESCRIPTION OF THE PREFERRED EMBODIMENTS

As previously discussed, high analysis fertilizers are desirable to minimize handling and storage problems by reducing the bulk weight of a fertilizer in that a more concentrated source of nutrients may be supplied per unit weight of material. The problem, however, is that the concentrated nutrient sources increase the possibility of root burn. Therefore, in order to develop an acceptable high analysis fertilizer in which the necessary amounts of nutrients may be supplied for a particular application, the final fertilizer composition should be free of high salt index nutrient sources, or if such sources are present, they should be generally insoluble so as to be slowly released over a period of time.

One of the more widely used or common sources of organic fertilizer material has been the synthetically manufactured product which contains amounts of nitrogen in both water soluble and water insoluble form. Ureaformaldehyde or ureaform is one such fertilizer. This water insoluble nitrogen source is advantageous for use in what may be considered slow release or long term fertilizing. That is, the insoluble nitrogen or components of the ureaformaldehyde form a suspension and not a solution when mixed with water and the nutrient value is therefore not immediately released or made available to plant life upon the application of the fertilizer to soil surfaces or subsurfaces.

The ureaformaldehyde is a mixture of unreacted and methylene ureas. The unreacted ureas are soluble in water and provide a relatively quick release source of nitrogen as compared to the slower release nitrogen of methylene ureas. The difference in the rate of nitrogen release is due to the fact that the methylene ureas are relatively long chain polymers which require bacterial decomposition to break down their structure and release the nitrogen while the short chain unreacted urea is immediately available. The nitrogen salts available from urea, however, have generally high salt indexes and if present in too great a concentration will tend to cause root burn.

In order to develop a high analysis, low burn fertilizer which provides an initial nitrogen release, as well as one which provides for extended nitrogen supply, a ureaformaldehyde is selected which supplies between one-half to three-quarters of its available nitrogen in a slow release form and from between one-quarter to one-half as unreacted urea for immediate absorption. Therefore, the slow to fast release nitrogen ratio which is determined by the ratio of methylene ureas to unreacted ureas, should range between 1:1 to 3:1, respectively. The presence of a large percentage of slow release nitrogen insures that the nitrogen salts will not be overly concentrated in the soil at the time of application but will be made available for plant absorption over a period of time. Additionally, the large percentage of slow release nitrogen insures that the nitrogen source does not leach away from the plant roots in a short time.

Although the ratio of slow to fast release nitrogen may vary somewhat, a preferred ureaformaldehyde is selected which supplies approximately two-thirds of its available nitrogen in a slow release form and one-third as unreacted urea which is soluble and therefore available for immediate absorption. By utilizing this 2:1 nitrogen releasing ratio, tests indicate that the breakdown or decomposition of ureaformaldehyde to form soluble nitrogen salts occurs over a period of several years under average soil and moisture conditions. In fact, over a period of the first year, approximately 60% of the insoluble ureaformaldehyde may be decomposed and after several years, amounts of up to 10% of the original nitrogen may still be available for ion release for plant absorption. Therefore, this use of ureaformaldehyde enables the long term availability of nitrogen by a one time fertilization process while simultaneously reducing plant burn due to an overly concentrated source of nitrogen salts.

It should be noted that if the ratio of slow to fast release nitrogen is increased to 3:1, the amount of nitrogen immediately available for plant absorption is decreased and the percentage of residual nitrogen release over a 2 year period, as indicated above, is increased and the burn potential further decreased.

Likewise, a slow to fast release nitrogen ratio of 1:1 decreases the effective residual organic material available to provide for long term nitrogen supplies but makes an increased amount of nitrogen available for immediate plant absorption. However, the concentration of available nitrogen salts is signficially increased and thus the possibility of plant or root burn is more likely. This, again, is particularly true in high analysis fertilizers wherein a substantial amount of nitrogen nutrient sources are available.

To effectively utilize ureaformaldehyde in conventional fertilizer spraying and subsurface injection apparatus, it is also necessary that it be used as a fine powder. The ureaformaldehyde particles must be small enough to pass a standard 60-mesh sieve; however, it is preferred that the major portion of such particles pass a 150-mesh sieve with many passing a 200-mesh sieve, and thus be of a consistency of a fine talc or hydrated lime. The particle size is necessary to permit the insoluble nitrogen sources to pass freely through conventional spray and injection apparatus when suspended in water.

As previously discussed, to provide a high analysis fertilizer formulation having immediately available inorganic nutrients, the synthetic organic nitrogen releasing material or compound is blended with various inorganic compounds to form fertilizer compositions in which the total percent of the nitrogen is equal to or exceeds 20% and the total percent of the nitrogen, potassium and phosphate nutrients is at least 40% of the overall fertilizer weight.

Ideally, the amounts, ratio, and types of nutrient ions to be applied should be based not only on an individual or species of plant requirements, but also on the presence of nutrients already in the soil. The nutrient compositions of a soil may be determined by various tests, however, it is not always economically feasible to have such tests made for every fertilizer application nor are such testing methods readily available to all consumers. Therefore, it is preferable to supply a fertilizer composition which is formulated to supply nutrients in the proper amounts and in the proper ratios for the plant itself. Further, if the fertilizer is made to contain low salt index salts or ions and/or slow release nutrients such as long chain ureaformaldehyde, the possibility of root or plant burn by an overfeeding is greatly reduced. That is, if various ions are already available in the soil, the addition of a fertilizer having a low salt index inorganic source of phosphorus and potassium, as well as a slow release nitrogen, will be less likely to cause plant damage than other formulations.

In this regard, it has long been known that a preferred ratio of the macro-nutrients, nitrogen, phosphorus and potassium for tree fertilization is in the range of 3:1:1, respectively, based on nutrient uptake and utilization. The amount of fertilizer applied, however, may vary dependent upon the size and type of tree or upon the square foot area defined by the drip line of a particular tree as well as upon the composition of the fertilizer itself. Fertilizers having both the necessary amount of nutrients and an approximate 3:1:1 ratio, allow for the desired promotion of growth in spring and summer by providing readily available nitrogen and also make available an annual supply of the macro-nutrients phosphorus and potassium.

The desired fertilizer formulation therefore should ideally meet the following criteria: First, the fertilizer should provide nutrients in the most advantageous or beneficial preparations to support plant growth and nourishment which for trees is a ratio of nitrogen to phosphorus to potassium of 3:1:1, respectively; second, the fertilizer should be blended using components or nutrient supplies of low burn characteristics; third, the particle size should permit both surface applications and subsurface injection; and fourth, the nitrogen nutrient source should include a significant percentage of slow release nitrogen which reduces burn potential, retards leaching, and provides for extended tree growth.

In order to achieve the desired characteristics, a ureaformaldehyde nitrogen source was selected having both slow and fast release nitrogen components in which the fast release nitrogen was available as a generally soluble unreacted or excess of urea and the slow release nitrogen was available as a generally insoluble long chain methylene urea. Such a ureaformaldehyde is Powder Blue, a product of Hercules Incorporated. The Powder Blue was formerly a waste byproduct collected after the production of a crystalline or chip ureaformaldehyde. It is currently being manufactured as a very fine powdery ureaformaldehyde material of a size to pass an 80-mesh sieve with most particles passing a 150-mesh sieve.

The use of Powder Blue as a fertilizing agent for use in irrigation system was tried but did not meet with commercial success due to its inherent property of settling out of suspension in the irrigation pipes and caking to form a hardened mass in such systems. The advantage of a product such as Powder Blue, however, is that the size of the insoluble nitrogen releasing components is such that they may pass through conventional sprayer or injection equipment as long as they are maintained in a liquid suspension and not allowed to settle after having been placed in suspension.

In order to complete the fertilizer blend, it was necessary to select a source of phosphorus and potassium which would not be injurious to plants and one which could be dry mixed with the fine particulate nitrogen source. In order to minimize the possibility of "root burn" monopotassium phosphate or monobasic phosphate, $KH_2PO_4$ which has an extremely low salt index, was chosen as the preferred inorganic nutrient source.

In this regard, other potassium phosphates have been considered; however, the monopotassium phosphate is the most desirable potassium phosphate compound for several reasons. First, the monopotassium phosphate has a salt index of 8.4 which is the lowest index of any conventional fertilizer material and thus the lowest burn potential. Second, the monopotassium phosphate is not hygroscopic and does not absorb moisture from the atmosphere, while other sources of potassium phosphate are hygroscopic and therefore are not as acceptable for dry blending. Third, the monopotassium phosphate has the additional advantage of having less effect on soil acidity than other potassium phosphates. Many of the available potassium phosphates are alkaline, having pH's of 9 to 10 or more. Such alkalinity may be undesirable for general tree fertilization. Monopotassium phosphate, however, is acidic (pH of 1% solution is 4.6), and therefore is less likely to adversely affect the soil acidity.

In order to provide sufficient nutrients in one application, the fertilizer should have a high analysis formulation with a low "burn" potential. Further, to decrease bulk weight and increase fluid applications, the fertilizer should be substantially free of fillers and binding agents. Therefore, one part of the monopotassium phosphate in granular or other form is combined with four parts of a 2:1 slow to fast release ureaformaldehyde in powder form and blended together in a homogeneous mixture. A resultant fertilizer analysis of (30-10-7) is achieved using four parts of Powder Blue, a ureaformaldehyde (38-0-0), blended with one part of monopotassium phosphate (0-52-35). The actual nutrient percentage of the final (30-10-7) composition is generally 47% (30+10+7) of the total weight. Deviations or limitations on this percentage are regulated by the agriculture laws of various political jurisdictions. In Ohio, the Ohio Fertilizer Law, Regulation AG-61-01.06 allows an analytical tolerance of 97%. Thus, the total nutrient value cannot be less than 97% of the 47% fertilizer formulation, or 45.59% nutrients. On an individual basis, the percentage of the total nitrogen, phosphorus or potassium may not vary more than 10% or below 2 percentage points below the guaranteed analysis, whichever is smaller. For instance, for the (30-10-7), the nitrogen may vary to 28%, as the 2 percentage points is less than 10% of 30 or 3%. However, a deviation of 2% would alter the total nutrients to a value less than the allowed 97% of total nutrients. For phosphorus and potassium, the percentage would be governed by the 10% deviation in the actual analysis which would be less than a 2% percentage point deviation in the analysis and therefore could be as low as 9.0 for phosphorus expressed as $P_2O_5$ and 6.3% for potash expressed as $K_2O$.

Again, the ratio of slow to fast release nitrogen may be effectively varied in the final composition by selecting a formulation of ureaformaldehyde having varied ratios of methylene ureas to unreacted ureas.

The previous example reflects approximately the 3:1:1 ideal fertilization ratio of nutrients desired for tree growth and nourishment using a (0-52-35) monopotassium phosphate. In order to further adjust the weight percent of potassium relative to the phosphorus, additional potassium compounds may be added, however, such additions increase the salt index of the resultant fertilizer and therefore is not desirable. Thus, the actual ratio is generally 3:1:less than 1.

In developing the aforementioned example, the nitrogen source was available as ureaformaldehyde (38-0-0)

or 38% nitrogen per 100 lbs. (45.36 kgs) and the monopotassium phosphate was available in a (0-52-35) or 52% phosphorus expressed as P$_2$O$_5$ and 35% soluble potash expressed as K$_2$O per 100 lbs. (45.36 kgs) of the blend. When adding the nitrogen and monopotassium phosphate sources, it is apparent that in order to achieve the approximate 3:1:1 ratio, 4 parts of the (38-0-0) or 400 lbs. (181.44 kgs) of the ureaformaldehyde should be uniformly blended with one part or 100 lbs. (45.36 kgs) of the monopotassium phosphate to get a 500 lb. (226.80 kgs) (152-52-35) blend or approximately (30-10-7) per 100 lbs. (45.36 kgs) of blended fertilizer.

Although this approximate 3:1:1 ratio reflected by the (30-10-7) blend is preferred, it has now been determined that slight variations of the nutrients N, P and K could be made without significantly altering the percent of each ingredient per 100 lbs. (45.36 kgs) and thus could be acceptable when used for similar applications. Specifically, suppose that only 300 lbs. (136.08 kgs) of the nitrogen source (38-0-0) were blended with 100 lbs. (45.36 kgs) of the monopotassium phosphate (0-52-35). The resultant blend would be a 400 lb. (180.44 kgs) (114-52-35) equivalent to a (28-13-9) blend per 100 lbs. (45.36 kgs). It can be seen that the (28-13-9) formulation does not vary greatly from the (30-10-7) preferred blend and in practice would be an acceptable fertilizer blend for many applications.

Likewise, if 200 lbs. (90.72 kgs) of the nitrogen source were used or blended with 100 lbs. (45.36 kgs) of the monopotassium phosphate, the resultant 300 lbs. (136.08 kgs) blend would be a (76-52-35) which is equivalent to a (25-17-12) based or 100 lbs. (45.36 kgs). Again the (25-17-12) formulation would appear to exhibit similar characteristics of the (30-10-7) formulation, although the degree of variation has almost become too significant to achieve the desired nutrient application and thus this formulation would not be as desirable for widespread application.

The two foregoing examples have reflected the possible acceptable deviations from the preferred 3:1:1 ratio of N:P:K discussed above when lesser amounts of nitrogen were added. Similarly, an increased amount of nitrogen could result in an acceptable formulation.

For example, if 500 lbs. (226.80 kgs) of the (38-0-0) nitrogen source were added or blended with the 100 lbs. (45.36 kgs) of the (0-52-35) monopotassium phosphate source, the resultant blend would be a (190-52-35) blend based on 600 lbs. (272.16 kgs) or equivalent to a (32-9-6) fertilizer based on 100 lbs. (45.36 kgs). Again, this formulation would be similar to the (30-10-7) preferred example in providing an acceptable nutrient supply source for general applications.

It should be noted that the same deviations in the actual percentages of the various final compositions of the foregoing examples may be acceptably varied within ranges as discussed above, dependent upon local regulations. Thus each fertilizer formulation should be understood to be alterable within the limits defined by law.

In addition to the acceptable degree of variation in the ratio of nitrogen nutrients to the inorganic nutrients as defined by law, the commercially available sources of monopotassium phosphate or nitrogen compound may also vary. That is, the (0-52-35) monopotassium phosphate is a commercially available food grade monopotassium phosphate. Another currently available monopotassium phosphate source is a (0-47-31) monopotassium phosphate. Further the ureaformaldehyde source may also vary from the preferred (38-0-0) depending upon commercially available sources.

The previous series of examples used a (0-52-35) monopotassium phosphate. However, it should be noted that the use of the (0-47-31) monopotassium phosphate results in fertilizer blends which are similarly suitable. For example, the following table shows the final 100 lb. nutrient equivalents of N:P:K per ratio of organic (38-0-0) ureaformaldehyde to the various inorganic components:

| Ratio of organic nitrogen releasing component to monopotassium phosphate (0-52-35), as shown in the previous examples | Nutrient Analysis for 100 lb. blend 3% |
|---|---|
| 5 to 1 | 32-9-6 |
| 4 to 1 | 30-10-7 |
| 3 to 1 | 28-13-9 |
| 2 to 1 | 25-17-12 |
| Ratio of organic nitrogen releasing Component to monopotassium phosphate (0-47-31) | Nutrient Analysis for 100 lb. blend 3% |
| 5 to 1 | 32-8-5 |
| 4 to 1 | 30-9-6 |
| 3 to 1 | 29-12-8 |
| 2 to 1 | 25-16-10 |

In view of the foregoing, it can be seen that by varying the ratio of the nitrogen releasing source to the monopotassium phosphate between 2 to 5:1 respectively, and dependent upon the nitrogen and monopotassium phosphate source, various high analysis fertilizers may be blended to have a resultant nutrient percentage per 100 lbs. of weight in the range of approximately 25 to 32% nitrogen; 17 to 8% phosphorus; and 12 to 5% potassium. The resultant fertilizers, and especially those utilizing a 3 to 5:1 ratio of nitrogen releasing component to monopotassium phosphate, respectively, are particularly suitable for application to trees to provide the necessary nutrient value without causing root burn or otherwise adversely affecting the acidity of the soil surrounding the plant root system.

As discussed above, in order to facilitate the dispensing of the fertilizer product when used in a conventional sprayer or injector, it is necessary that the organic material pass an 80-mesh sieve as the insoluble portions thereof will be suspended in a liquid solution when mixed with water for use. Because the monopotassium phosphate is soluble and will therefore form a liquid when mixed with water, there need not be any specific size requirement with regard thereto; although a generally fine to granular size is preferred to insure a more homogeneous mixture.

Blending of the organic synthetic material and the inorganic material is complicated by the fact that ureaformaldehyde of the size required tends to flow or separate from the larger inorganic material when mixed by fertilizer blending equipment. However, by utilizing a curved bladed rotary type bulk mixer which operates in much the same manner as a cement mixer, the monopotassium phosphate and ureaformaldehyde were blended in a homogeneous mixture using the above compound ratios. Further, the resultant fertilizer blend remained thoroughly mixed even after shipping and handling.

In use, the high analysis fertilizer compositions of ureaformaldehyde and monopotassium phosphate are mixed as described above and shipped to various supply outlets and/or potential users in dry form, thus simplifying product handling and storage as well as reducing the shipping weight. When it is desired to use the product, it is mixed with varying quantities of water depending upon the type of application. Fertilizer strengths which are equivalent to six pounds of nitrogen to each thousand square feet have been safely applied to lawn areas and trees without causing any plant or root burn.

Further, due to the fact that the insoluble ureaformaldehyde particles which are suspended in solution when the fertilizer is mixed with water are so small, the fertilizer may be applied to surface or subsurface areas utilizing sprayers and pressure or hydraulic injection equipment without clogging equipment valves and nozzles.

I claim:

1. A dry high analysis fertilizer composition containing the nutrients N, P and K comprising organic and inorganic nutrient components, said organic component being a powdered ureaformaldehyde blend of a size to pass an 60-mesh sieve, said ureaformaldehyde having generally water soluble and water insoluble nitrogen releasing nutrient compounds, said water insoluble compound being methylene urea and said water soluble compound being unreacted urea, the ratio of said water insoluble compound to said water soluble compound being approximately one to three parts of methylene urea to one part of unreacted urea, said inorganic component being monopotassium phosphate, said organic and inorganic components being mixed uniformly throughout the fertilizer composition in a ratio by weight of approximately 2 to 5 parts organic component to 1 part inorganic component, whereby the effective percentage of the nutrients N, P and K are present generally in the ranges between 25% to 32% for nitrogen, 17% to 8% phosphorus expressed as $P_2O_5$, and 12% to 5% soluble potash expressed as $K_2O$.

2. The composition of claim 1 in which said organic component has an approximate ratio of 2:1 of insoluble to soluble nitrogen releasing compounds.

3. The composition of claim 1 in which said powdered ureaformaldehyde is of a size to pass a 150-mesh sieve.

4. A dry high analysis fertilizer composition containing the nutrient N, P and K comprising first and second nutrient compounds, said first nutrient compound being powdered ureaformaldehyde of a size to pass an 60-mesh sieve, said ureaformaldehyde having a ratio of between 1 to 3 parts of methylene urea to 1 part unreacted urea, said second nutrient compound being monopotassium phosphate, said first and second nutrient compounds being mixed so that the fertilizer composition is supplied with the nutrients N, P and K in an approximate ratio by weight of from 2 to 5:1:1 respectively, and said first and second nutrient compounds being uniformly distributed throughout the fertilizer composition.

5. The composition of claim 4 in which said first nutrient compound has an approximate ratio of 2:1 of methylene urea to unreacted urea.

6. The composition of claim 4 in which said ratio of N, P and K is approximately 3:1:1.

7. A dry high analysis fertilizer composition containing essential nutrients N, P and K comprising a homogeneous mixture of an organic nitrogen releasing component and an inorganic component, said fertilizer composition being free of fillers and binding agents and adapted to be mixed with water and applied by injection and spraying from conventional equipment, said organic component including a water soluble nitrogen releasing unreacted urea and a water insoluble nitrogen releasing methylene urea, said methylene urea being in a powdered form having particles of a size to pass an 60-mesh sieve with most particles passing a 150-mesh sieve, said inorganic component being water soluble monopotassium phosphate, said organic component and said inorganic component being mixed in a ratio by weight of from 2 to 5 parts of organic component to 1 part inorganic component.

8. The composition of claim 7 in which the ratio of said methylene urea to said unreacted urea is approximately 2:1.

9. A dry high anlysis fertilizer composition containing the nutrients N, P and K comprising an organic nutrient component for supplying N and an inorganic nutrient component supplying P and K, said organic component being a ureaformaldehyde having generally water soluble and water insoluble nitrogen releasing nutrient compounds, said water insoluble nitrogen releasing nutrient compound being methylene urea of a size to pass an 80-mesh sieve, said water soluble nitrogen releasing compound being unreacted urea, the amount of said water insoluble nitrogen releasing compound in said organic component being generally greater than the amount of said water soluble nitrogen releasing compound, said inorganic component supplying the nutrients P and K being only monopotassium phosphate, said organic and inorganic components being mixed uniformly throughout the fertilizer composition in a ratio by weight of approximately 2 to 5:1 respectively, whereby the effective resultant fertilizer analysis indicating the percentage of the nutrients N, P and K which are present is generally in the range of a (25-17-12) to (32-8-5).

10. The composition of claim 9 in which said organic component has an approximate ratio of 2:1 of insoluble to soluble nitrogen releasing compounds.

11. The composition of claim 9 in which said methylene urea is of a size to pass a 150-mesh sieve.

* * * * *